United States Patent [19]

Mikhailov et al.

[11] 4,285,189
[45] Aug. 25, 1981

[54] TOBACCO HARVESTER

[76] Inventors: Anatoly P. Mikhailov, ulitsa Moskovskaya, 52, kv. 40, Krasnodar; Petr F. Tomarovsky, sovkhoz "Alma-Atinsky", ulitsa Dokuchaeva, 7, Alma-Atinskaya oblast; Arstan S. Mukanov, ulitsa Kalinina, 77, kv. 11, Alma-Ata; Alexandr N. Soloviev, ulitsa Proletarskaya, 94, kv. 67, Alma-Ata; Evgeny A. Kononov, ulitsa M. Gorkogo, 149, kv. 117, Alma-Ata; Alexandr P. Zhukov, ulitsa Kosmonavtov, 96/1, kv. 31, Alma-Ata; Ivan P. Leonov, ulitsa Kirova, 60, kv. 12, Krasnodar; Shavarsh M. Grigorian, ulitsa 4 Gastello, 6/40, Erevan; Vladislav K. Novinsky, Rostovskoe shosse, 8/67, Krasnodar; Jury I. Rabotkin, proezd Stroitelny, 37, Krasnodar; Igor B. Poyarkov, ulitsa Voroshilova, 39, kv. 20, Krasnodar; Viktor P. Fedoseev, ulitsa Pushkina, 5/13, Krasnodarsky krai, poselok Oktyabrsky; Nikolai N. Shelukha, Abinsky pereulok, 12., Krasnodar; Amangeldy Utinchiev, ulitsa Saina, 94, kv. 14, Alma-Ata; Boris V. Chursin, ulitsa Kosmonavtov, 17, kv. 29, Alma-Ata; Dostan Kaliev, ulitsa Furmanova, 126, kv. 14., Alma-Ata; Vladimir A. Ustich, ulitsa Krasnaya, 204, kv. 3, Krasnodar

[21] Appl. No.: 147,246

[22] Filed: May 6, 1980

[51] Int. Cl.³ .............................................. A01D 45/16
[52] U.S. Cl. ..................................................... 56/27.5
[58] Field of Search ................. 56/27.5, 130, 330, 111, 56/119

[56] References Cited

U.S. PATENT DOCUMENTS 3,601,959  8/1971  Pinkham ............................... 56/27.5

FOREIGN PATENT DOCUMENTS 579962  11/1977  U.S.S.R. ................................... 56/27.5

*Primary Examiner*—Jay N. Eskovitz
*Attorney, Agent, or Firm*—Robert E. Burns; Emmanuel J. Lobato; Bruce L. Adams

[57] ABSTRACT

The herein-proposed harvester is intended largely for tobacco harvesting by the leaf picking, and comprises a self-propelled chassis which carries a conveyer for holding the tobacco stalk in a vertical position, a leaf stripper situated below said conveyer, and a means for withdrawing the severed tobacco leaves, located under the leaf stripper.

The leaf stripper is made as a row of parallel drums the shaft of each of which carries augers and brushes, the diameter of the drum with the brushes exceeding the diameter of the drum auger. The auger is made fast on the drum shaft through bushes which are adjustably mounted on the shaft so as to control the angle of the auger helix, whereas the drums allow their angle to the horizontal and the angularity therebetween to be adjusted.

The conveyer is made as two adjacent strands provided with a plurality of elastic oppositely directed projections which are spaced equidistantly on each of the strands in such a manner that the projections on one of the strands are offset by half the pitch with respect to the projections on the adjacent strand, said projections, when in a free state, having the height exceeding the distance between the conveyer stands. The conveyer mounts a means for lifting the drooping tobacco leaves made as oppositely rotating drums with brushes secured to the drum shafts.

5 Claims, 6 Drawing Figures

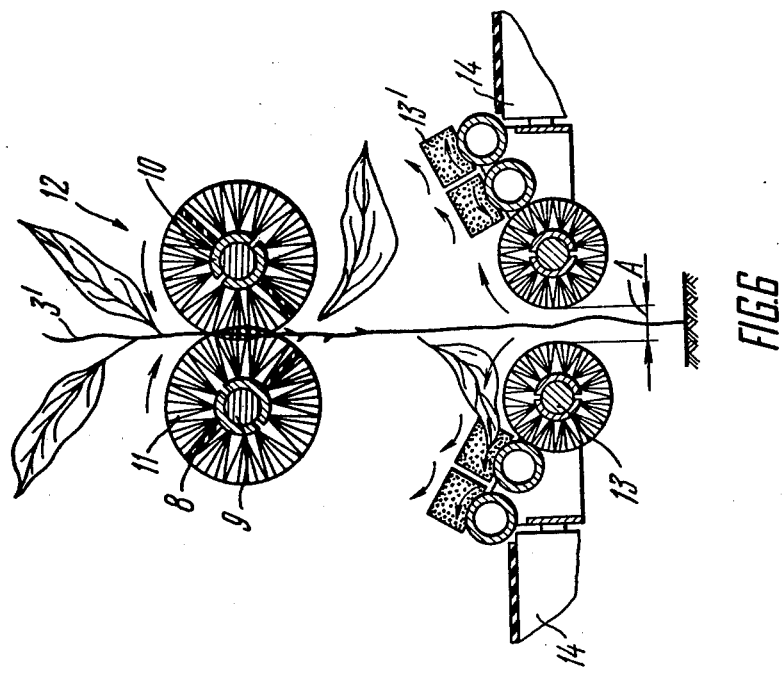
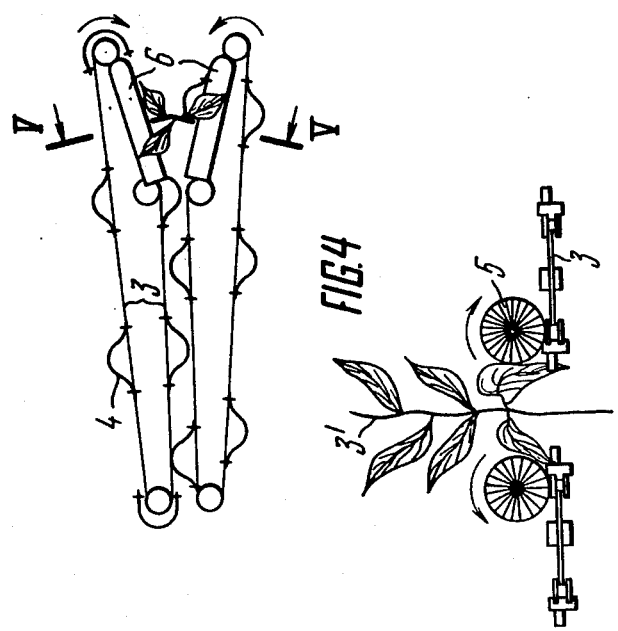

TOBACCO HARVESTER

The present invention relates generally to farm mechanization and more specifically to a tobacco harvester.

The invention can find most utility when applied for tobacco harvesting by the leaf picking.

The present invention is also applicable to picking the leaves of some other crops whose physico-mechanical characteristics and harvesting method are similar to those of tobacco.

One of the most labourious processes of tobacco feed stock is tobacco leaf harvesting. Therefore, an ever-growing production of tobacco feed stock in the USSR and necessity of cutting down labour consumption in tobacco harvesting, increasing labour productivity and doing away with strenuous manual labour called for the provision of a tobacco harvester.

Known in the present state of the art are leaf-picking tobacco harvesters manufactured by Reynolds and Powell companies (U.S.A.). The Model "Poanoke" tobacco harvester available from Reynolds Co. is known to comprise a self-propelled chassis which carries the working tools. The leaf stripper of the harvester is made up by a pair of parallel augers set at an angle to the horizontal, featuring a fixed angle of the blade twist and having toothed edges, said augers being made of rubber having a hardness of 40 to 60 units as measured by a durometer. The front ends of the augers mount the story dividers of the tobacco leaves being severed, said dividers being intended to lift the dropping leaves and being made as cantilevered metal guide members. A means for withdrawing the picked-up leaves located under the leaf stripper is essentially an inclined screen conveyer arranged on both sides of the leaf stripper intake gap. Two adjacent conveyer strands are provided under the leaf stripper to retain the tobacco stalks in the vertical position, said conveyer strands being made as endless V-belts.

The tobacco harvester discussed above operates as follows. As the harvester travels along the tobacco rows the plants are directed to wards the intake gap of the leaf stripper by the guide members, while the story divider lifts the drooping leaves. Further on, the plants are held, below the story of the leaves being picked up, between the strands of the conveyers that rotate in opposite directions at a speed equal to the harvester travelling speed but directed oppositely with respect thereto; thus the plant is brought into the leaf stripper effective zone, wherein the augers of the leaf stripper, while rotating round their own axes, act upon the stems or midribs of the leaves to sever them from the stalks and throw onto the screen conveyers which traverse in a crosswise direction with respect to the tobacco rows. Said conveyers withdraw the picked up leaves and deliver them to a device for feeding the leaves to a receptacle. In order to withdraw the falling leaves provision is made for drums located nearby the leaf stripper intake gap, said drums being built up by a plurality of tapered rubber rings and rotating at a speed equal to that of the augers.

The tobacco harvester manufactured by Powell Co., U.S.A., is similar to the afore-considered one, differing in that the blades of the leaf stripper augers are devoid of teeth, and the means for withdrawal of the severed leaves is made as a roller bed having a train of rollers rotating round their own axes parallel to the leaf stripper. In addition, said harvester features also another constructional arrangement of the device for feeding the severed leaves to a receptacle.

A disadvantage inherent in the tobacco harvesters discussed above resides in that they are designed for picking up the leaves of the grade Virginia tobacco which possesses a firm and well developed root system and a stiff stalk, but are not suitable for picking up the leaves of tobacco grades having a low-stiffness stalk and poorly developed rootage. This is due to the fact that the auger-type leaf stripper of the tobacco harvesters under consideration inflicts damage to the tobacco stalks or tumbles them down owing to its being too rigid and having no realiable means for holding the stalks in a vertical position. Furthermore, the adopted construction of the leaf stripper and no provision of an efficient device for lifting the drooping leaves contribute to a larger scope of mechanical damage of the leaves.

One more tobacco harvesting machine protected by U.S. Patent No. 3,601,959. IPC A01D45/15, is known to comprise a self-propelled chassis traveling along the tobacco rows and carrying a leaf stripper composed by a pair of augers arranged on both sides of the tobacco row, each of the augers being made of curved rubber plates having serrated edges. The machine is provided with a mechanism for adjusting the position of the leaf stripper both horizontally and vertically with respect to the raw of plants being harvested.

One more device is provided for adjusting the tobacco stalks for position and retaining them in a vertical attitude, said device incorporating two endless belts arranged on both sides of the leaf stripper intake gap. The machine is also equipped with two conveyers located under the leaf stripper and adapted to withdraw the severed leaves, each of said conveyers being composed of a plurality of rollers situated on both sides of the stripper intake gap and capable of rotating round their own axes.

Receptacles for the severed leaves are situated on both sides of the roller conveyers.

The tobacco harvesting machine in question operates as follows. While travelling along the tobacco rows the machine directs the plants towards the leaf stripper intake gap through the agency of the guide member. Then the rotating augers of the leaf stripper beat at the stems of the leaves to sever them from the stalk. At the moment of leaf stripping the plants are held in a vertical position by two endless conveyer belts situated on both sides of the tobacco row and travelling at a speed equal to that of the machine but in opposite direction. The severed leaves drop onto the roller bed to be fed to the receptacles.

The machine discussed above suffers from the disadvantage that like the machines considered hereinbefore it is designed for harvesting only the grade Virginia tobacco that possesses a stiff stalk and a well spread rootage, but cannot be applied for harvesting tobacco grades having an inadequately stiff stalk and poorly developed root system. The adopted construction of the leaf stripper causes mechanical damage to the leaves being severed, whereas no provision of an efficient story divider for the drooping leaves to lift and the construction of the conveyer for holding the stalk in a vertical position also increase the scope of damage inflicted upon the leaves being picked up.

It is therefore an object of the present invention to reduce the scope of mechanical damage to tobacco leaves when machine-harvested.

It is another object of the present invention to increase labour productivity in tobacco harvesting.

It is one more object of the present invention to cut down the prime cost of tobacco feed stock in the case of machine tobacco harvesting.

Said and other objects of the present invention are accomplished by that in a tobacco harvester comprising a self-propelled chassis which mounts two adjacent conveyer strands adapted for holding the stalk of the plant in a vertical position with a means for lifting the drooping leaves, a leaf stripper situated under said conveyer and made as parallel drums whose shafts carry augers, said drums being in an angular position with respect to the direction of the harvester travelling, and a means for withdrawing the severed leaves located under the leaf stripper, according to the invention the shaft of each of the leaf strippers carries brushes, whereas the diameter of the drum with the brushes exceeds the auger diameter, and the strands of the conveyer adapted for holding the tobacco stalks in a vertical position have a number of equidistantly spaced elastic oppositely arranged projections, the projections of one of the conveyer strands being offset by half the pitch with respect to the projections of the other strand, the height of said projections, when in a released state, exceeding the distance between the adjacent conveyer strands.

The herein-proposed invention is instrumental in attaining a considerably higher quality of the tobacco leaves being harvested due to a lower scope of mechanical damage caused thereto during the harvesting process. This is achieved owing to the provision of brushes on the auger shafts so as to reduce the area of contact of the auger blade with the leaf being severed, inasmuch as it is the brush that is first to contact the leaf and urge it down, and only thereupon the auger blade beats at the stem (or midrib) of the leaf to sever it from the stalk.

The construction of the conveyer for holding the stalk in a vertical position enables the plant to be kept reliably in that position at the moment of the leaf severing without inflicting any mechanical damage to the leaves.

It is expedient that the augers of the leaf stripper drums be secured in position on the shaft through the intermediary of bushes adjustably mounted on the shaft so as to control the angle of the auger helix.

Such a mode of fixing the augers on the shaft enables a story-after-story harvesting of tobacco leaves.

It is quite reasonable that said conveyer be provided with a means for lifting the drooping leaves made as a pair of drums carrying brushes secured on the shaft thereof and rotating in the opposite directions.

The proposed construction of the means for lifting the drooping leaves makes it possible to preclude jamming the tobacco leaves between the conveyer strands and avoid damage to the leaves.

In one of the practical embodiments of the present invention each of the elastic projections is tapered in a longitudinal section.

The taper shape of the conveyer projections contributes to a reliable retention of the tobacco stalks in a vertical position at the moment of leaf severing without inflicting any mechanical damage to the leaves and stalks.

In another embodiment of the present invention the drums are so mounted as to make possible the adjustment of the angle of their incline to the horizontal and the angle of the mutual arrangement of the drums. Provision of the drums for lifting the drooping leaves making possible the adjustment of the angle they make up with the horizontal and the angle at which the drums are arranged relative to one another allows the tobacco harvester of the invention to be utilized for harvesting both narrow- and broadleaf tobacco grades and provides for quality tobacco harvesting when the moisture content in the leaves is variable, thus affording a reliable lifting of the drooping leaves and dividing the story being harvested.

Further objects and advantageous features of the present invention will become apparent from a consideration of a detailed disclosure of a specific embodiment thereof given by way of example with reference to the accompanying drawings, wherein:

FIG. 4 is a diagrammatic view of a conveyer for holding the plants in a vertical position;

FIG. 5 is a section taken along the line V—V in FIG. 4; and

FIG. 6 is a section taken along the VI—VI in FIG. 2.

Figures 1, 2:
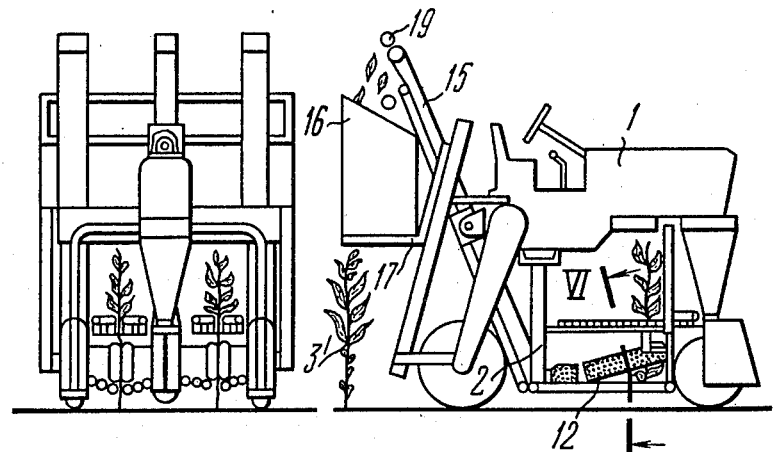
FIG. 1 is a general front-elevation view of a tobacco harvester, according to the invention.
FIG. 2 is a general side-elevation view of a tobacco harvester, according to the invention.
Figure 3:
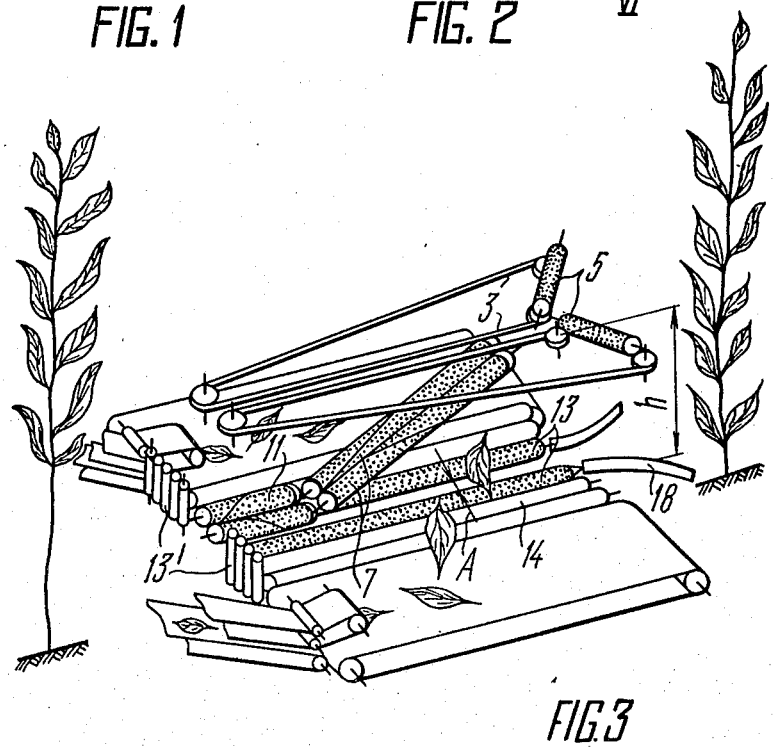
FIG. 3 is a diagrammatic view of a leaf stripper.

Referring now to the accompanying drawings, the tobacco harvester of the present invention comprises a self-propelled chassis 1 (FIGS. 1, 2) that carries a frame 2 on which all the units and components of the harvester are mounted. A conveyer 3 (FIGS. 3, 4, 5) is mounted on the frame 2 within the zone of orienting the stalks and leaves, said conveyer being adapted for holding tobacco plants 3' in a vertical position and being made as two endless chains which carry equidistantly spaced elastic projections 4 (FIG. 4), the projections 4 on one of the strands of the conveyer 3 being offset by half the pitch thereof with respect to the projections 4 on the other strand. When in a free state the projections 4 have their height exceeding the distance between the adjacent strands of the conveyer 3, whereas during operation said projections 4 are tightly pressed, due to their elasticity, against the opposite strand of the conveyer 3, thus firmly holding the plants 3' in a vertical position. The front portion of the conveyer 3 mounts a device 5 (FIG. 5) for lifting the drooping leaves, fashioned as cantilevered drums 6 provided with brushes made fast on the shafts thereof.

Located under the conveyer 3 is a leaf stripper 7 made as augers 8 secured on shafts 9 through bushes 10, brushes 11 being mounted on the shaft 9 between the blades of the auger 8. The shaft 9 makes up, along with the auger 8 and the brushes 11, a drum 12. The fact that the auger 8 is fixed on the shaft through the bushes 10 enables one to adjust the angle of helix of the blades of the auger 8 to suit the height of the story of the leaves being harvested. The leaf stripper 7 is set at an angle to the direction of the harvester travel, and has a device for adjusting its position both horizontally and vertically. The diameter of the drum 12 with the brushes exceeds the diameter of the auger 8, thus establishing more favourable conditions for the operation of the leaf stripper 7 due to a reduced zone of contact of the auger 8 with the leaf being severed.

Arranged below the leaf stripper 7 are drums 13 (FIGS. 3, 6) with the brushes, said drums defining an intake gap "A" and being adapted for withdrawing the severed leaves. Provided in the rear portion of the gap "A" (as along the harvester travel) are rollers 13' serving as a safeguarding wall to prevent the picked up leaves from falling on the earth. Arranged on both sides of the gap "A" below the leaf stripper 7 and behind the drums 12 are level conveyers 14 which terminate in inclined conveyers 15 (FIG. 2) adapted to transfer the severed leaves to a receptacle bin 16 mounted on a hydraulic hoist 17 behind the inclined conveyers 15.

Guide members 18 (FIG. 3) are secured to the front end of the conveyers 14.

Brushes 19 (FIG. 2) are mounted on the top portion of the conveyors 15, adapted for cleaning the belts of the conveyors 14 of tobacco leaves stuck thereto and directing said leaves to the receptacle bin 16.

The tobacco harvester of the present invention operates as follows.

Prior to starting harvester operation one must determine the height of the story of the leaves being harvested which depends upon the degree of their maturity. Then the drums 12 of the leaf stripper 7 are set to a required angle of slope for picking up the leaves of a given harvesting story, and the augers 8 are made fast on the shafts 9 at a certain angle of helix thereof. The brush-carrying drums for lifting the drooping leaves are adjusted for a definite angularity with respect to one another and a required angle to the horizontal, depending upon the grade of tobacco being harvested and the stage of its harvesting.

The receptacle bin 16 is set to the topmost position by means of the hydraulic hoist 17. Next the drums 12 of the leaf stripper 7 are set in rotation, whereupon the harvester starts travelling along the rows of the plants 3'.

As the harvester travels along the rows the plants are directed towards the intake gap of the leaf stripper 7 by the guide members 18 at the butt of the plant, and by the conveyer 3 at the top of the plant, whereby the plant is reliably held in a vertical position. At the same time the device 5 lifts the drooping leaves and avoids spontaneous jamming of the leaves between the strands of the conveyer 3, thus precluding mechanical damage to the leaves.

The leaves are severed from the stalks of the plants 3' by the leaf stripper 7 whose drums 12 rotate against each other. Provision of the brushes 11 smoothes and damps the beat of the blades of the augers 8 against the leaf which, in turn, prevents mechanical damage to the leaf blade while the leaf is being severed from the stalk. The severed leaves drops upon the drums 13 to be fed by the latter to the conveyers 14 and further on by the conveyers 15 to the bin 16. The brushes 19 clear the belts of the conveyers 14 of the tobacco leaves stuck thereto and simultaneously direct the leaves into the bin 16.

What is claimed is:

1. A tobacco harvester comprising: a self-propelled chassis; a conveyer adapted for holding the tobacco stalk in a vertical position and mounted on said chassis, said conveyer being essentially made as two adjacent strands provided with elastic oppositely directed projections, said projections being spaced equidistantly over said conveyer strands, and the projections on one of the strands are offset by half the pitch with respect to the projections on the adjacent strand, the height of said projections, when in a free state, exceeding the distance between said conveyer strands; a means for lifting the drooping tobacco leaves mounted on said conveyer; a leaf stripper situated on said chassis under said conveyer, said stripper being made in the form of parallel drums provided with augers and brushes set on the shafts of said drums, the diameter of each of said drums complete with the brushes exceeding the diameter of said auger of the drum; a means for withdrawing the severed tobacco leaves mounted on said chassis below said leaf stripper.

2. A tobacco harvester as claimed in claim 1, wherein the augers of the leaf stripper drums are secured on the shaft through bushes which are adjustably mounted on the shaft so as to control the angle of the auger helix.

3. A tobacco harvester as claimed in claim 1, wherein said conveyer is provided with a means for lifting the drooping leaves, made as a pair of oppositely rotating drums with brushes fixed on their shafts.

4. A tobacco harvester as claimed in claim 1, wherein each of the elastic projections is taper-shaped in longitudinal section.

5. A tobacco harvester as claimed in claim 2, wherein the drums are so mounted as to adjust their angle of inclination to the horizontal and the angularity therebetween.

* * * * *